US012752316B2

(12) United States Patent
Kohler

(10) Patent No.: US 12,752,316 B2
(45) Date of Patent: Oct. 6, 2026

(54) DIRECTED FLOW PRESSURE WASHER SYSTEM, METHOD AND APPARATUS

(71) Applicant: Richard E. Kohler, Langhorne, PA (US)

(72) Inventor: Richard E. Kohler, Langhorne, PA (US)

(73) Assignee: Richard E. Kohler, Langhorne, PA (US)

( * ) Notice: Subject to any disclaimer, the term of this patent is extended or adjusted under 35 U.S.C. 154(b) by 72 days.

(21) Appl. No.: 19/025,224

(22) Filed: Jan. 16, 2025

(65) Prior Publication Data

US 2025/0161997 A1 May 22, 2025

Related U.S. Application Data

(60) Division of application No. 17/172,402, filed on Feb. 10, 2021, which is a continuation of application No. 16/169,183, filed on Oct. 24, 2018, now Pat. No. 10,960,441.

(51) Int. Cl.

*B08B 5/00* (2006.01)
*B08B 3/04* (2006.01)
*B08B 3/10* (2006.01)

(52) U.S. Cl.

CPC .................. *B08B 5/00* (2013.01); *B08B 3/04* (2013.01); *B08B 3/102* (2013.01)

(58) Field of Classification Search

None

See application file for complete search history.

(56) References Cited

U.S. PATENT DOCUMENTS

| | | | |
|---|---|---|---|
| 4,029,115 | A | 6/1977 | Wheeler |
| 4,934,392 | A | 6/1990 | Henfrey |
| 4,951,713 | A | 8/1990 | Jordan et al. |
| 5,195,549 | A | 3/1993 | Adams |
| 5,551,909 | A | 9/1996 | Bailey |
| 6,270,584 | B1 | 8/2001 | Ferrell et al. |
| 6,325,359 | B1 | 12/2001 | Haga et al. |
| 6,332,470 | B1 | 12/2001 | Fishkin et al. |
| 6,951,221 | B2 | 10/2005 | Okuda et al. |

(Continued)

FOREIGN PATENT DOCUMENTS

| | | |
|---|---|---|
| CN | 100336605 | 9/2007 |
| CN | 103068496 A | 4/2013 |

(Continued)

*Primary Examiner* — Kaj K Olsen
*Assistant Examiner* — Ryan L Coleman
(74) *Attorney, Agent, or Firm* — Fox Rothschild LLP

(57) ABSTRACT

A directed flow pressure washer system for precision cleaning of one or more parts includes a gas source containing a gas, a solvent source containing a solvent, and a plurality of inlets connected to an elongated pipe tubing. The gas source is connected to a first inlet. The first inlet is configured to receive the gas therethrough, the solvent source is connected to a second inlet, and the second inlet is configured to receive the solvent therethrough. The system includes a component retainer removably attached to the elongated pipe tubing. The parts are located in the elongated pipe tubing at the distal end such that the parts are exposed to a directed variable pressure and flow rate of the gas and/or the solvent. The component retainer is configured with one or more openings at an outlet thereof to allow particles therethrough while retaining the parts during cleaning.

19 Claims, 4 Drawing Sheets

(56) References Cited

U.S. PATENT DOCUMENTS

| | | | |
|---|---|---|---|
| 7,946,299 | B2 | 5/2011 | Franklin et al. |
| 8,137,576 | B2 | 3/2012 | Harumoto et al. |
| 8,551,257 | B2 | 10/2013 | Carlson et al. |
| 9,238,787 | B2 | 1/2016 | Carlson et al. |
| 10,960,441 | B2 | 3/2021 | Kohler |
| 2008/0128032 | A1 | 6/2008 | Lapetina et al. |
| 2010/0229953 | A1 | 9/2010 | Stuart |
| 2012/0018534 | A1 | 1/2012 | Gilpatrick |
| 2012/0037194 | A1 | 2/2012 | Suydam |
| 2015/0328657 | A1 | 11/2015 | Kenny, Jr. |
| 2016/0339458 | A1 | 11/2016 | Fu et al. |
| 2021/0085069 | A1 | 3/2021 | Loichinger et al. |

FOREIGN PATENT DOCUMENTS

| | | | |
|---|---|---|---|
| CN | 103191880 | A | 7/2013 |
| DE | 3009313 | A1 | 9/1980 |
| DE | 4327960 | A1 | 2/1995 |
| GB | 2450938 | A | 1/2009 |
| TW | 436916 | B | 5/2001 |
| WO | 2014146555 | A1 | 9/2014 |

DIRECTED FLOW PRESSURE WASHER SYSTEM, METHOD AND APPARATUS

CROSS-REFERENCE TO RELATED APPLICATIONS

This application is a divisional of U.S. patent application Ser. No. 17/172,402, filed Feb. 10, 2021, which is a continuation of U.S. patent application Ser. No. 16/169,183 filed on Oct. 24, 2018, the entire contents of which are incorporated by reference herein.

TECHNICAL FIELD

The present disclosure relates to the field of precision cleaning, and more particularly, to a directed flow pressure washer system, method and apparatus for the precision cleaning of parts in bulk for various industries.

BACKGROUND

Conventional precision cleaning systems, methods and apparatuses for the cleaning of parts, particularly small parts in bulk, present many challenges. In particular, ultrasonic cleaning, tumbling and pressure washing with detergent, deionized water, solvents or other chemicals have limited ability to penetrate a large mass of components evenly and quickly. Precision cleaning systems from various companies in the industry use trays, racks and baskets to hold the parts. Self-contained cleaning systems do the same. Parts placed in a basket for bulk cleaning expose the outermost parts to the best cleaning. Sprayers and tumblers rely on repetition to cover all areas effectively leaving results uneven. Parts that are tumbled do not have the rinse flow rate for the best particle removal. Conveyor systems also rely on baskets to secure the parts with the same deficiency. Ultrasonic cleaning does not penetrate the entire depth of parts to be cleaned. Parts that are pressure washed are exposed to the most intense pressure near the nozzle and pressure is quickly dissipated by distance and deflection. The mass of parts can hold particulate like a filter. Small parts must be contained, but bulk containment usually sacrifices consistency. Smaller batches for cleaning increase the cost.

It would thus be desirable to have an improved precision cleaning system, method and apparatus, among other desirable features as described herein, which avoid the disadvantages of conventional precision cleaning systems, methods and apparatuses.

SUMMARY

In a first aspect, there is provided herein a directed flow pressure washer system for precision cleaning of parts. The system includes a plurality of inlets connected to an elongated pipe tubing at a proximal end thereof via an inlet tee fitting. The plurality of inlets are configured to receive at least a gas, a detergent or surfactant, and a solvent, intermittently or simultaneously therethrough. A gas source supplies the gas configured to be connected to one of the plurality of inlets configured to receive the gas via a first tubing. A detergent or surfactant source supplies the detergent or surfactant configured to be connected to one of the plurality of inlets configured to receive the detergent or surfactant via a second tubing. A solvent source supplies the solvent configured to be connected to one of the plurality of inlets configured to receive the solvent via a third tubing. A component retainer is removably attached to the elongated pipe tubing at a distal end thereof. The elongated pipe tubing is configured to contain the parts therein such that the parts are exposed to a directed variable pressure and flow rate of the gas, the detergent or surfactant, and the solvent. The component retainer includes openings at an outlet thereof to allow particles therethrough while retaining the parts therein the elongated pipe tubing during cleaning.

In certain embodiments, the gas, the detergent or surfactant, and the solvent are configured to be filtered to a predetermined micron level before passing therethrough the inlet tee fitting for cleaning of the parts in the elongated pipe tubing.

In certain embodiments, the plurality of inlets are controllable via a shut-off valve for each inlet such that the gas, the detergent or surfactant, and the solvent flow intermittently or simultaneously therethrough and into the inlet tee fitting.

In certain embodiments, the gas accelerates the solvent and forms pockets of gas that compress and push through the parts contained therein the elongated pipe tubing and triggers a repeating pulse of energy during cleaning.

In certain embodiments, turbulence and change from liquid to gas push particles in one direction by pulsing from start to finish during cleaning.

In certain embodiments, change from gas to liquid and back provides energy to dislodge particles and moves liberated particles through a mass of the parts and in turn through the component retainer outlet.

In certain embodiments, the plurality of inlets are configured with at least one optional valve or orifice to regulate back pressure during cleaning.

In certain embodiments, the plurality of inlets are configured to receive process aids during cleaning.

In certain embodiments, the gas source includes at least one of nitrogen, compressed air, argon, carbon dioxide, or other product compatible pressurized gas.

In certain embodiments, the detergent or surfactant source includes at least one of any compatible detergent solution.

In certain embodiments, the solvent source includes at least one of ultra-pure de-ionized water, distilled water, hydrogen peroxide, mineral spirits, rust inhibitor or industrial cleaning solvent.

In a second aspect, there is provided herein a directed flow pressure washer method for precision cleaning of parts. The method includes the following steps: connecting a plurality of inlets to an elongated pipe tubing at a proximal end thereof via an inlet tee fitting; configuring the plurality of inlets for receiving at least a gas, a detergent or surfactant, and a solvent, intermittently or simultaneously therethrough; providing a gas source for supplying the gas configured to be connected to one of the plurality of inlets configured to receive the gas via a first tubing; providing a detergent or surfactant source for supplying the detergent or surfactant configured to be connected to one of the plurality of inlets configured to receive the detergent or surfactant via a second tubing; providing a solvent source for supplying the solvent configured to be connected to one of the plurality of inlets configured to receive the solvent via a third tubing; placing the parts for cleaning inside the elongated pipe tubing at a distal end thereof; attaching a component retainer configured with openings at an outlet thereof to the elongated pipe tubing at the distal end thereof for containing the parts therein and allowing particles therethrough during cleaning; exposing the parts to a directed variable pressure and flow rate of the gas, the detergent or surfactant, and the solvent, intermittently or simultaneously; removing the attached component retainer from the distal end of the elongated pipe tubing after cleaning is completed; and removing the cleaned parts from the elongated pipe tubing.

In certain embodiments, the step of configuring the plurality of inlets for receiving at least the gas, the detergent or surfactant, and the solvent, intermittently or simultaneously therethrough further includes: filtering the gas, the detergent or surfactant, and the solvent to a predetermined micron level before passing therethrough the inlet tee fitting for cleaning of the parts in the elongated pipe tubing.

In certain embodiments, the step of configuring the plurality of inlets for receiving at least the gas, the detergent or surfactant, and the solvent, intermittently or simultaneously therethrough further includes: configuring the plurality of inlets with at least one optional valve or orifice to regulate back pressure during cleaning.

In certain embodiments, the step of configuring the plurality of inlets for receiving at least the gas, the detergent or surfactant, and the solvent, intermittently or simultaneously therethrough further includes: feeding at least one of the detergent or surfactant and the solvent at a predetermined pressure and flow rate into the inlet tee fitting with the gas fed at one of the plurality of inlets, thereby forming a pressure washing chamber.

In certain embodiments, the step of exposing the parts to the directed variable pressure and flow rate of the gas, the detergent or surfactant, and the solvent, intermittently or simultaneously, further includes: feeding the detergent or surfactant followed by the solvent pushed with the gas at a predetermined pressure and flow rate into the inlet tee fitting, the gas triggering surges in the solvent forming turbulence for distribution of the detergent or surfactant, particle liberation and flow over the parts during cleaning.

In certain embodiments, the step of exposing the parts to the directed variable pressure and flow rate of the gas, the detergent or surfactant, and the solvent, intermittently or simultaneously, further includes: configuring the plurality of inlets to be switched from detergent to rinse to purge for an integrated cleaning method that washes, rinses, pressure washes and dries.

In certain embodiments, the step of removing the cleaned parts from the elongated pipe tubing further includes: storing or packaging the cleaned parts until next use.

In a third aspect, there is provided herein a directed flow pressure washer apparatus for precision cleaning of parts. The apparatus includes a plurality of inlets connected to an elongated pipe tubing at a proximal end thereof via an inlet tee fitting. The plurality of inlets are configured to receive at least a gas, a detergent or surfactant, and a solvent, intermittently or simultaneously therethrough. A component retainer is removably attached to the elongated pipe tubing at a distal end thereof. The elongated pipe tubing is configured for containing the parts therein and for exposing the parts to a directed variable pressure and flow rate of the gas, the detergent or surfactant, and the solvent. The component retainer includes openings at an outlet thereof for allowing particles therethrough while retaining the parts therein the elongated pipe tubing during cleaning.

In certain embodiments, the plurality of inlets are controllable via a shut-off valve for each inlet for controlling the flow and pressure of the gas, the detergent or surfactant, and the solvent, intermittently or simultaneously therethrough and into the inlet tee fitting.

Various advantages of this disclosure will become apparent to those skilled in the art from the following detailed description, when read in light of the accompanying drawings.

DETAILED DESCRIPTION

This disclosure is not limited to the particular apparatus, systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All sizes recited in this document are by way of example only, and the disclosure is not limited to structures having the specific sizes or dimensions recited below. As used herein, the term "comprising" means "including, but not limited to."

In consideration of the figures, it is to be understood for purposes of clarity that certain details of construction and/or operation are not provided in view of such details being conventional and well within the skill of the art upon disclosure of the document described herein.

The present disclosure pertains to a directed flow pressure washer system, method and apparatus for the precision cleaning of parts in bulk for various industries. The restriction of overspray directed within the confined space of the tubing allows positive contact with each part to be cleaned. The use of gas, such as nitrogen, to accelerate the solvent creates pockets of gas that compress and push through the parts to be cleaned. This turbulence and change from liquid to gas push particulate in one direction by pulsing from beginning to end. This system and method requires all parts to be exposed to the pressure and flow rate of the cleaning source. When sized appropriately, the parts are exposed to an intense flow rate not available otherwise. The inlet can be switched from detergent to rinse to purge for an integrated cleaning method that washes, rinses, pressure washes and dries. This can also establish a packaging method by not removing the cleaned parts and instead of bagging or weighing for counting, instead sealing the vessel and rotating parts from manufacturing, to cleaning, to storage, to assembly, and back again. This may also allow the vessel to be a type of magazine for manual or robotic assembly, which could eliminate sources of contamination from handling.

Figure 1:
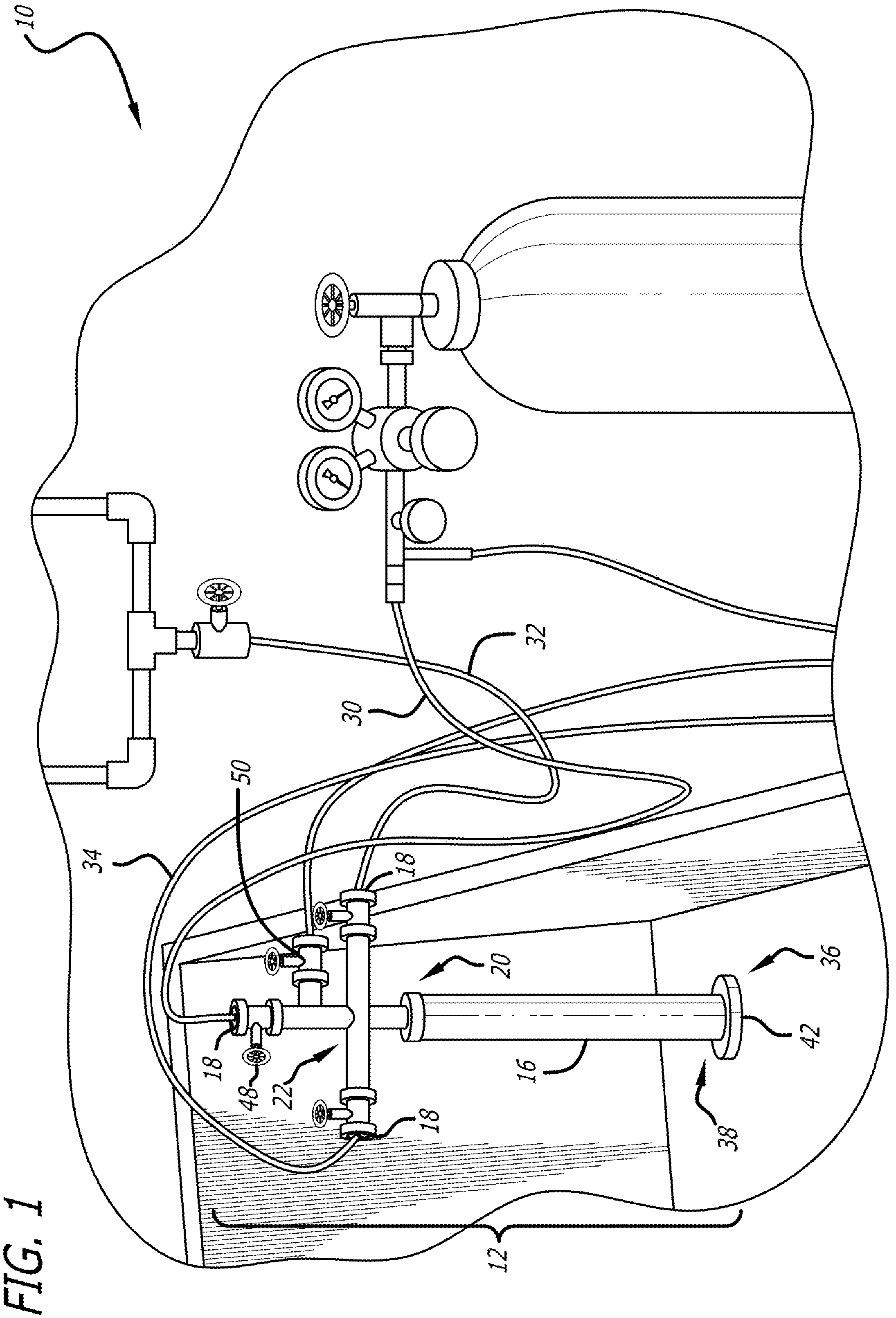
FIG. 1 is a perspective view of a setup of the directed flow pressure washer system and apparatus for precision cleaning of parts in accordance with an example embodiment of the present disclosure.
Figure 2:
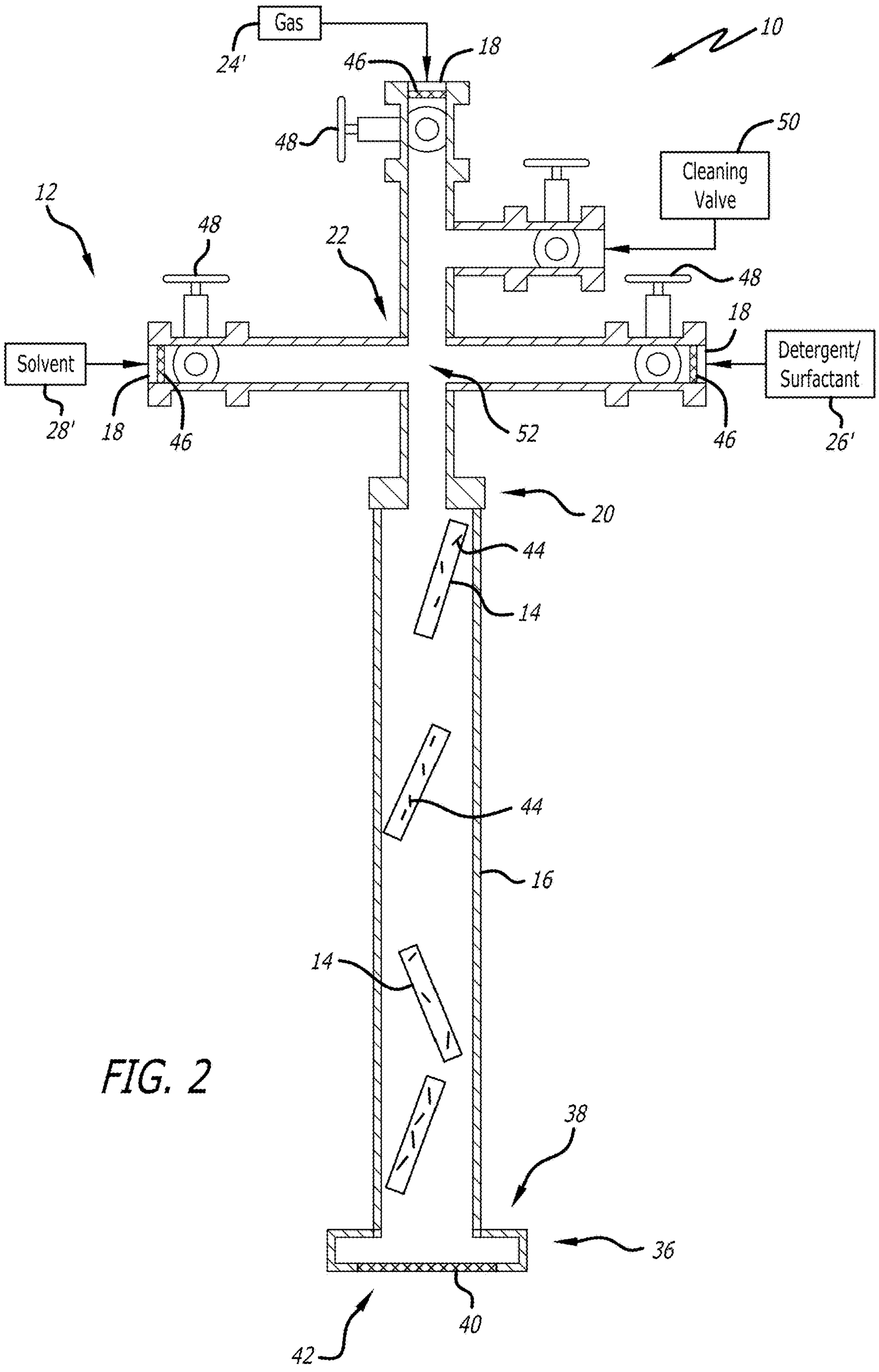
FIG. 2 is an enlarged sectional view of the directed flow pressure washer system and apparatus shown with parts to be precision cleaned placed in an elongated pipe tubing in accordance with an example embodiment of the present disclosure.

Referring now to the drawings, the directed flow pressure washer system 10 and apparatus 12 of the present disclosure will be described in more detail. FIG. 1 is a perspective view of a setup of the directed flow pressure washer system 10 and apparatus 12 for precision cleaning of parts 14 (FIGS. 2-4) according to the present disclosure. FIG. 2 is an enlarged sectional view of the directed flow pressure washer system 10 and apparatus 12 shown with parts 14 to be precision cleaned placed in an elongated pipe tubing 16. The system 10 generally includes a plurality of inlets 18 connected to an elongated pipe tubing 16 at a proximal end 20 thereof via an inlet tee fitting 22. The plurality of inlets 18 are configured to receive at least a gas 24, a detergent or surfactant 26, and a solvent 28, intermittently or simultaneously therethrough. A gas source 24' supplies the gas 24 configured to be connected to one of the plurality of inlets 18 configured to receive the gas 24 via a first tubing 30. A detergent or surfactant source 26' supplies the detergent or surfactant 26 configured to be connected to one of the plurality of inlets 18 configured to receive the detergent or surfactant 26 via a second tubing 32. A solvent source 28' supplies the solvent 28 configured to be connected to one of the plurality of inlets 18 configured to receive the solvent 28 via a third tubing 34. A component retainer 36 is removably attached to the elongated pipe tubing 16 at a distal end 38 thereof. The elongated pipe tubing 16 is configured to contain the parts 14 therein such that the parts 14 are exposed to a directed variable pressure and flow rate of the gas 24, the detergent or surfactant 26, and the solvent 28. The component retainer 36 includes openings 40 at an outlet 42 thereof to allow particles 44 therethrough while retaining the parts 14 therein the elongated pipe tubing 16 during cleaning.

In accordance with the present disclosure, the gas 24, the detergent or surfactant 26, and the solvent 28 are configured to be filtered 46 to a predetermined micron level before passing therethrough the inlet tee fitting 22 for cleaning of the parts 14 in the elongated pipe tubing 16.

In the illustrated embodiments, the plurality of inlets 18 are controllable via a shut-off valve 48 for each inlet 18 such that the gas 24, the detergent or surfactant 26, and the solvent 28 flow intermittently or simultaneously therethrough and into the inlet tee fitting 22.

Figure 3:
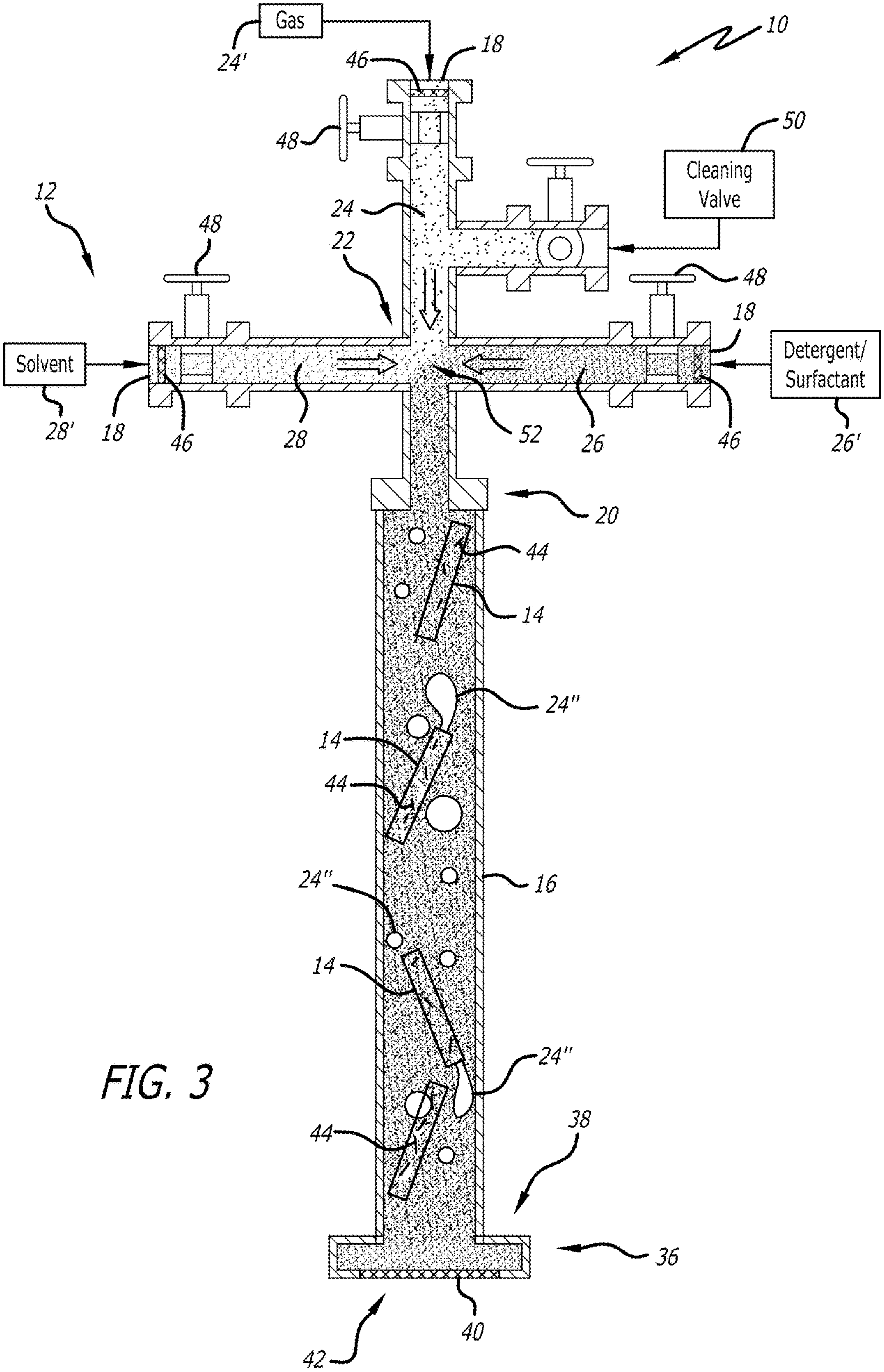
FIG. 3 is an enlarged sectional view of the directed flow pressure washer system and apparatus shown with parts in process of being precision cleaned in the elongated pipe tubing in accordance with an example embodiment of the present disclosure.

FIG. 3 is an enlarged sectional view of the directed flow pressure washer system 10 and apparatus 12 shown with parts 14 in process of being precision cleaned in the elongated pipe tubing 16 according to the present disclosure. In some embodiments, the gas 24 accelerates the solvent 28 and forms pockets of gas 24" that compress and push through the parts 14 contained therein the elongated pipe tubing 16 and triggers a repeating pulse of energy during cleaning. As shown in FIG. 3, in this embodiment, solvent 28 and the gas 24 create a mixture which submerges and washes the parts 14 that are retained at the component retainer 36.

In other embodiments, turbulence and change from liquid to gas 24 push particles 44 in one direction by pulsing from start to finish during cleaning. It is to be understood that the liquid is in the form of the detergent or surfactant 26 and/or solvent 28 used with the directed flow pressure washer system 10 and apparatus 12 disclosed herein.

Figure 4:
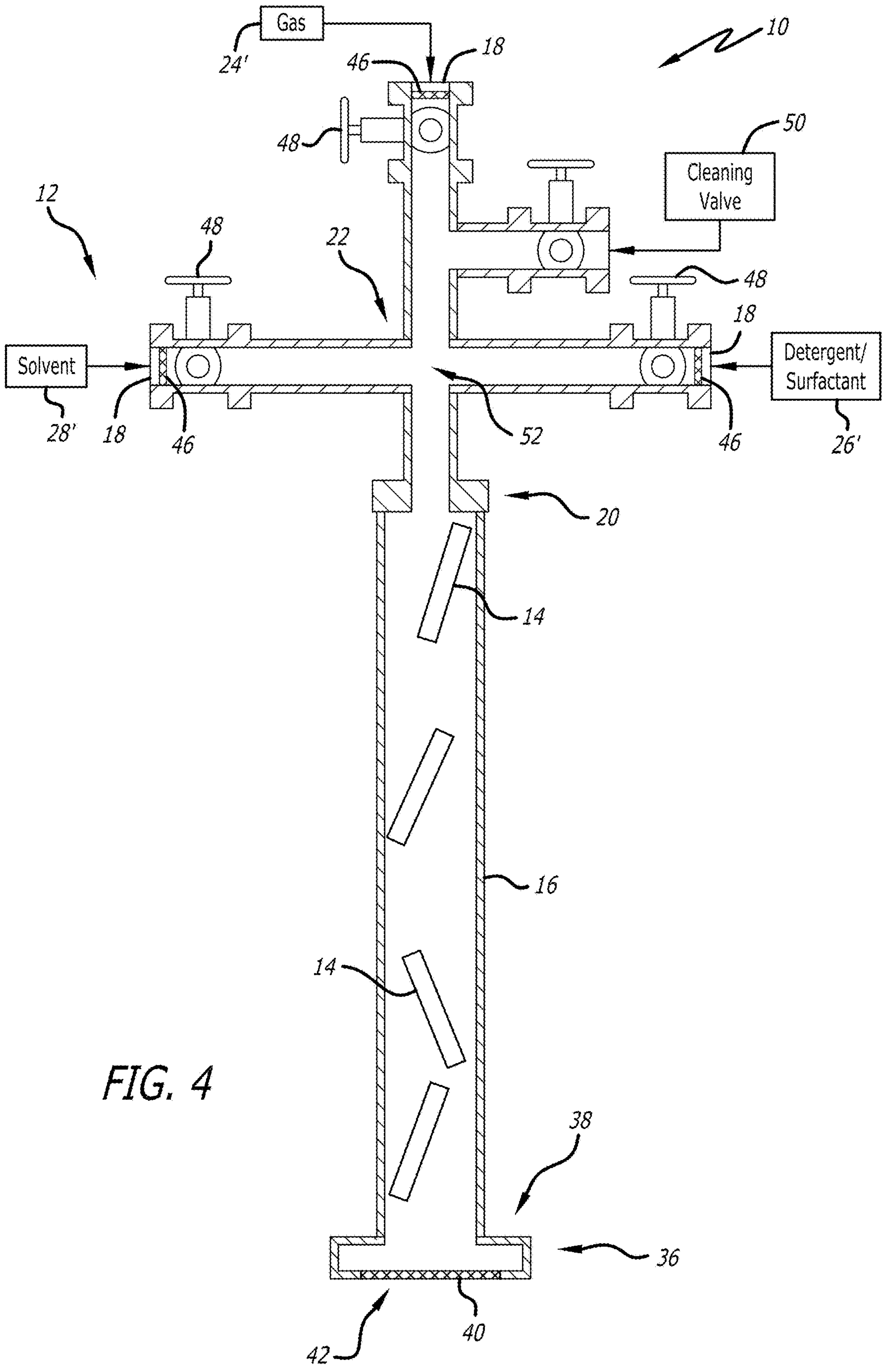
FIG. 4 is an enlarged sectional view of the directed flow pressure washer system and apparatus shown with the cleaned parts retained by the component retainer in accordance with an example embodiment of the present disclosure.

FIG. 4 is an enlarged sectional view of the directed flow pressure washer system 10 and apparatus 12 shown with the cleaned parts 14 retained by the component retainer 36 according to the present disclosure. The removed particles exit the component retainer 16 through the openings 40 at the outlet 42 after cleaning is completed.

In the illustrated embodiments, change from gas 24 to liquid and back provides energy to dislodge particles 44 and moves liberated particles 44 through a mass of the parts 14 and in turn through the component retainer outlet 42.

In some embodiments, the plurality of inlets 18 are configured with at least one optional valve or orifice (cleaning valve) 50 to regulate back pressure during cleaning.

It is to be understood that the three-way valves of the inlet tee fitting 22 shown in the figures are customized to the particular cleaning process and can be configured to toggle between detergent and water during the cleaning process. In addition, it is to be understood that the cleaning may be performed without the detergent as a minimum such that just gas and water is used in the cleaning process. However, most parts 14 would benefit from the addition of the detergent or surfactant in the cleaning process as disclosed herein.

In other embodiments, the plurality of inlets 18 are configured to receive process aids (not shown) during cleaning. In particular, chlorinated water, isopropyl alcohol (IPA), and hydrogen peroxide can be used to sterilize the parts 14 and silicon oil or another lubricant may need to be applied to a surface of the parts 14 in a pure state. For example, a secondary solvent or gas can be used to sterilize or condition the parts 14 and oxygen or ozone can be used to finish the surface of parts 14.

In some embodiments, the gas source 24' includes at least one of nitrogen, compressed air, argon, carbon dioxide, or any other suitable product compatible pressurized gas. The gas 24 accelerates solvent 28 flow in pulses compressing between surges of solvent 28.

In some embodiments, the detergent or surfactant source 26' includes at least one of any suitable compatible detergent solution. The detergent or surfactant 26 is selected for material compatibility and specification compliance. Non-limiting examples of suitable detergents that can be used in the system 10 include ALCONOX, LIQUINOX, Triton X-100, Sodium Hydroxide, CITRISURF, Optical Cleaning Solution, Brulin, and other commercial cleaning solutions.

In certain embodiments, the solvent source 28' includes at least one of ultra-pure de-ionized water, distilled water, hydrogen peroxide, mineral spirits, rust inhibitor or industrial cleaning solvent. It is to be understood that the solvent source 28' can be any suitable solvent and is not limited to those disclosed herein for use in the directed flow pressure washer system 10 of the present disclosure. The solvent 28 is selected per material compatibility.

In accordance with the present disclosure, the additional parameters of temperature and sonic cavitation can be included in the directed flow pressure washer system 10. Increasing temperature can remove soluble residues such as hydrocarbon and paraffin, and sonication can supplement particle liberation if transducers (not shown) are mounted to the cleaning chamber.

It is to be understood that the various components (i.e., inlet tee fitting 22, elongated pipe tubing 16, and component retainer 36) of the apparatus 12 disclosed herein can be fabricated of metals, metal alloys, stainless steel, plastic or any suitable sturdy material. It is to be further understood that the various components of the apparatus 12 can be of any suitable size and shape to accommodate the parts 14 to be precision cleaned via the directed flow pressure washer system 10 and method of the present disclosure.

In accordance with the present disclosure, the various components of the apparatus 12 disclosed herein can be manufactured via 3D printing, injection molding, roll forming, extrusion, welding or any suitable manufacturing process.

The present disclosure further contemplates a method for a directed flow pressure washer method for precision cleaning of parts using the system 10 and apparatus 12 disclosed herein. The method generally includes the following steps:

- connecting a plurality of inlets 18 to an elongated pipe tubing 16 at a proximal end 20 thereof via an inlet tee fitting 22;
- configuring the plurality of inlets 18 for receiving at least a gas 24, a detergent or surfactant 26, and a solvent 28, intermittently or simultaneously therethrough;
- providing a gas source 24' for supplying the gas 24 configured to be connected to one of the plurality of inlets 18 configured to receive the gas 24 via a first tubing 30;
- providing a detergent or surfactant source 26' for supplying the detergent or surfactant 26 configured to be connected to one of the plurality of inlets 18 configured to receive the detergent or surfactant 26 via a second tubing 32;
- providing a solvent source 28' for supplying the solvent 28 configured to be connected to one of the plurality of inlets 18 configured to receive the solvent 28 via a third tubing 34;
- placing the parts 14 for cleaning inside the elongated pipe tubing 16 at a distal end 38 thereof;
- attaching a component retainer 36 configured with openings 40 at an outlet 42 thereof to the elongated pipe tubing 16 at the distal end 38 thereof for containing the parts 14 therein and allowing particles 44 therethrough during cleaning;
- exposing the parts 14 to a directed variable pressure and flow rate of the gas 24, the detergent or surfactant 26, and the solvent 28, intermittently or simultaneously;
- removing the attached component retainer 36 from the distal end 38 of the elongated pipe tubing 16 after cleaning is completed; and
- removing the cleaned parts 14 from the elongated pipe tubing 16.

In some embodiments, the step of configuring the plurality of inlets 18 for receiving at least the gas 24, the detergent or surfactant 26, and the solvent 28, intermittently or simultaneously therethrough further includes: filtering the gas 24, the detergent or surfactant 26, and the solvent 28 to a predetermined micron level via a filter 46 before passing therethrough the inlet tee fitting 22 for cleaning of the parts 14 in the elongated pipe tubing 16.

In other embodiments, the step of configuring the plurality of inlets 18 for receiving at least the gas 24, the detergent or surfactant 26, and the solvent 28, intermittently or simultaneously therethrough further includes: configuring the plurality of inlets 18 with at least one optional valve or orifice (cleaning valve) 50 to regulate back pressure during cleaning.

In other embodiments, the step of configuring the plurality of inlets 18 for receiving at least the gas 24, the detergent or surfactant 26, and the solvent 28, intermittently or simultaneously therethrough further includes: feeding at least one of the detergent or surfactant 26 and the solvent 28 at a predetermined pressure and flow rate into the inlet tee fitting 22 with the gas 24 fed at one of the plurality of inlets 18 (see directional flow indicated by arrows in FIG. 3), thereby forming a pressure washing chamber 52.

In some embodiments, the step of exposing the parts 14 to the directed variable pressure and flow rate of the gas 24, the detergent or surfactant 26, and the solvent 28, intermittently or simultaneously, further includes: feeding the detergent or surfactant 26 followed by the solvent 28 pushed with the gas 24 at a predetermined pressure and flow rate into the inlet tee fitting 22 (see directional flow indicated by arrows in FIG. 3), the gas 24 triggering surges in the solvent 28 forming turbulence for distribution of the detergent or surfactant 26, particle liberation and flow over the parts 14 during cleaning.

In other embodiments, the step of exposing the parts 14 to the directed variable pressure and flow rate of the gas 24, the detergent or surfactant 26, and the solvent 28, intermittently or simultaneously, further includes: configuring the plurality of inlets 18 to be switched from detergent to rinse to purge for an integrated cleaning method that washes, rinses, pressure washes and dries.

In further embodiments, the step of removing the cleaned parts 14 from the elongated pipe tubing 16 further includes: storing or packaging the cleaned parts 14 until next use.

It is to be understood that filtration, pressure, flow, elongated tubing size and the component retainer will vary with process control parameters. The diameter of the chamber in the elongated pipe tubing 16 should allow the voids between the parts 14 to be cleaned sufficient flow so as to not inhibit the pulsing action while cleaning. Excessive space would not equally clean parts because pulses would not be produced and insufficient space would result in a significantly reduced flow rate, which would fail to propel fine particulate. Detergents provide increased wetting at poorly accessible surfaces due to contact. When cleaning with a proper flow rate, the detergent assists in the expulsion of particulate.

These and other advantages of the present disclosure will be apparent to those skilled in the art. Accordingly, it will be recognized by those skilled in the art that changes or modifications may be made to the above-described embodiments without departing from the broad inventive concepts of the present disclosure. It should therefore be understood that the present disclosure is not limited to the particular embodiments described herein, but is intended to include all changes and modifications that are within the scope and spirit of the disclosure as encompassed by the disclosure and figures herein and the following claims.

What is claimed is:

1. A method for precision cleaning of one or more parts, comprising:

- providing an elongated pipe tubing having a proximal end and a distal end, the proximal end including a plurality of inlets comprising at least a first inlet and a second inlet;
- providing a component retainer configured to be attached to the distal end of the elongated pipe tubing;
- controlling the first inlet to receive a gas therethrough;
- controlling the second inlet to receive a solvent therethrough;
- supplying the gas from a gas source to the first inlet;
- supplying the solvent from a solvent source to the second inlet;
- placing the one or more parts for cleaning inside the elongated pipe tubing at the distal end thereof, wherein the one or more parts are removable from the elongated pipe tubing after being placed inside the elongated pipe tubing;
- wherein the component retainer is removably attached to the elongated pipe tubing at the distal end of the elongated pipe tubing, and wherein the component retainer comprises openings that are sized to allow particles to pass through the openings and to prevent the one or more parts from being able to pass through the openings;
- controlling the first and second inlets to cause the gas and the solvent to flow simultaneously or intermittently through the first inlet and the second inlet, respectively, to wash the one or more parts that are retained in the elongated pipe tubing.

2. The method of claim 1, further comprising:
removing the component retainer from the distal end of the elongated pipe tubing after cleaning is completed; and
removing the one or more parts form the elongated pipe tubing.

3. The method of claim 1, further comprising:
sealing the one or more parts in the elongated pipe tubing after cleaning is completed; and
storing or packing the one or more parts.

4. The method of claim 1, further comprising:
providing a detergent or surfactant source for supplying a detergent or surfactant, wherein the detergent or surfactant is received through a third inlet.

5. The method of claim 1, further comprising configuring the plurality of inlets with at least one valve or orifice to regulate back pressure during cleaning.

6. The method of claim 1, wherein the solvent is provided at a certain pressure and flow rate into an intersection with the gas.

7. The method of claim 4, wherein controlling the first and second inlets to cause the gas and the solvent to flow comprises:
pushing the solvent with the gas, wherein the gas triggers surges in the solvent and forms turbulence for distribution of the detergent or surfactant, and wherein the gas causes particle liberation and flow over the one or more parts during cleaning.

8. The method of claim 7, wherein controlling the first and second inlets to cause the gas and the solvent to flow comprises:
configuring the plurality of inlets to be switched from detergent to rinse to purge for an integrated cleaning method that washes, rinses, pressure washes and dries.

9. A method for precision cleaning of one or more parts, comprising:
placing the one or more parts into a tubing, wherein the one or more parts are removable from the tubing after being placed inside the tubing;
providing a component retainer configured to be attached to a distal end of the tubing;
supplying a solvent from a solvent source into the tubing at a proximal end of said tubing;
supplying a gas from a gas source into the tubing via a gas inlet, wherein the gas source is separate from the solvent source;
wherein the component retainer is removably attached to the tubing at the distal end of the tubing, and wherein the component retainer comprises openings that are sized to allow particles to pass through the openings and to prevent the one or more parts from being able to pass through the openings;
controlling the gas supplied via the gas inlet to form pockets of gas in the solvent flowing through the tubing, thereby accelerating the solvent and triggering a pulse of energy;
cleaning a surface of the one or more parts within the tubing by subjecting the surface to the flow of the gas in the solvent.

10. The method of claim 9, further comprising:
immersing the one or more parts in a solution containing the solvent within the tubing.

11. The method of claim 9, wherein the component retainer is removably attached to the tubing.

12. The method of claim 9, further comprising:
removing the component retainer from the distal end of the tubing after cleaning is completed; and
removing the one or more parts from the tubing.

13. The method of claim 9, further comprising:
sealing the one or more parts in the tubing after cleaning is completed; and
storing or packing the one or more parts.

14. The method of claim 9, further comprising:
providing a solvent inlet connected to the tubing for supplying the solvent.

15. The method of claim 14, wherein the gas inlet and the solvent inlet are connected to the tubing to cause a turbulence and a change from liquid to gas that pushes particles in one direction during cleaning.

16. The method of claim 14, further comprising:
exposing the one or more parts to a directed variable pressure and flow rate of the gas and/or the solvent.

17. The method of claim 14, further comprising:
pushing the solvent with the gas, wherein the gas triggers surges in the solvent and forms turbulence, and wherein the gas causes particle liberation and flow over the one or more parts during cleaning.

18. The method of claim 9, further comprising:
providing a detergent or surfactant source for supplying a detergent or surfactant, wherein the detergent or surfactant source is connected to a third inlet.

19. The method of claim 9, further comprising:
providing at least one valve or orifice to regulate back pressure during cleaning.

* * * * *